US006464187B1

(12) United States Patent
Bieck et al.

(10) Patent No.: US 6,464,187 B1
(45) Date of Patent: Oct. 15, 2002

(54) HOLDING DEVICE FOR A DRINK CONTAINER

(75) Inventors: Thorsten Bieck, Waldachtal; Falk Schaal, Alpirsbach; Hans-Peter Stoll, Dornstetten; Jochen Bollaender, Ingolstadt; Gunter Breyer, Ettig, all of (DE)

(73) Assignee: Fischerwerke Artur Fischer GmbH & Co., KG, Waldachtal (DE)

( * ) Notice: Subject to any disclaimer, the term of this patent is extended or adjusted under 35 U.S.C. 154(b) by 0 days.

(21) Appl. No.: 09/589,651

(22) Filed: Jun. 8, 2000

(30) Foreign Application Priority Data

Jun. 8, 1999 (DE) .......................... 199 26 003

(51) Int. Cl.[7] .................................................. A47K 1/08
(52) U.S. Cl. ..................................... 248/311.2; 224/926
(58) Field of Search ............................. 248/309.1, 310, 248/311.2, 27.1, 315, 318; 224/296

(56) References Cited

U.S. PATENT DOCUMENTS

| 5,141,194 A | * | 8/1992 | Burgess et al. | 248/311.2 |
| 5,379,978 A | * | 1/1995 | Patel et al. | 248/311.2 |
| 5,505,417 A | * | 4/1996 | Plocher | 248/311.2 |
| 5,673,891 A | * | 10/1997 | Jujihara et al. | 248/311.2 |
| 5,692,718 A | * | 12/1997 | Bieck | 248/311.2 |
| 5,845,888 A | * | 12/1998 | Anderson | 248/311.2 |
| 5,890,692 A | * | 4/1999 | Lee et al. | 248/311.2 |
| 5,952,218 A | * | 9/1999 | Lee et al. | 435/288 |
| 5,988,579 A | * | 11/1999 | Moner, Jr. et al. | 248/311.2 |
| 6,019,334 A | * | 2/2000 | Shinomiya | 248/311.2 |
| 6,105,917 A | * | 8/2000 | Yabuya et al. | 248/311.2 |
| 6,250,527 B1 | * | 6/2001 | Mizue et al. | 224/281 |

FOREIGN PATENT DOCUMENTS

| DE | 43 18 249 A1 | 12/1994 |
| DE | 198 25 795 A1 | 1/1999 |
| EP | 0 739 774 A1 | 10/1996 |

* cited by examiner

Primary Examiner—Ramon O. Ramirez
Assistant Examiner—Kofi Schulterbrandt
(74) Attorney, Agent, or Firm—Michael J. Striker

(57) ABSTRACT

A holding device for a drink container has a sliding guide element, a carriage displaceably guided by the sliding guide element, a holding element arranged on the carriage and having an insertion opening for insertion of a drinks container, the holding element and the carriage being connected with one another by a four-lever mechanism, with the four-lever mechanism, the control lever being pressed down upon displacement of the carriage from the pulled-out position to the inserted position, thus moving the holding element from the raised position to the lowered position, at least one of two elements selected from the group consisting of the four-lever mechanism and the control lever forming a safety catch that prevents the holding element in the raised position from being pressed downwards.

6 Claims, 5 Drawing Sheets

HOLDING DEVICE FOR A DRINK CONTAINER

BACKGROUND OF THE INVENTION

The invention relates to a holding device for a drinks container, such as, for example, a cup, a beaker or a drinks can, which is provided for installation in a motor vehicle. The holding device has a sliding guide element, in which a carriage is displaceably guided from an inserted position to a pulled-out position. In the pulled-out position, a drinks container can be placed on the carriage.

Moreover, the holding device has a holding element that is, for example, ring-shaped, which is arranged on the carriage and has an insertion opening for the insertion of the drinks container. The holding element is connected to the carriage by means of a four-lever mechanism, one lever of the four-lever mechanism being formed by the holding element and an opposite lever of the four-lever mechanism being formed by the carriage. The four-lever mechanism enables the holding element to move from a lowered position in which it rests flat on the carriage to a position in which it is raised above the carriage. In the lowered position of the holding element, the carriage and the holding element are flat and can thus be pushed into a flat housing so as to save space. In the raised position, the holding element, into the insertion opening of which the drinks container can be inserted, is spaced vertically from the carriage on which the drinks container can be placed, so that the holding element surrounds an inserted drinks container at a height that provides a secure position for the drinks container.

The holding element is raised by means of an erecting spring element that engages the four-lever mechanism and urges the holding element to the raised position. The holding element is raised automatically upon displacement of the carriage to the pulled-out position. In order to lower the holding element onto the carriage upon displacement to the inserted position and thus to be able to push the carriage together with the holding element, for example, into a flat housing, the holding device according to the invention has a control lever which is mounted pivotally on the carriage and engages one lever of the four-lever mechanism. Upon displacement of the carriage from the pulled-out position to the inserted position, the control lever is pressed down and thus moves the holding element downwards against the force of the erecting spring element into the lowered position on the carriage. The control lever can be pressed down, for example, by an upper edge of an opening, through which the carriage is inserted, for example, into a housing. A guide track arrangement, for example, can also be provided, which presses the control lever downwards upon displacement of the carriage to the inserted position.

SUMMARY OF THE INVENTION

Accordingly, it is an object of present invention to provide a holding device for a drinks container which has a holding element secured in the position it is raised above the carriage and can not be pressed down unintentionally.

In keeping with these objects and with others which will become apparent hereinafter, one feature of present invention resides, briefly stated, in a holding device for a drinks container, which has a sliding guide element, a carriage displaceably guided by the sliding guide element in a manner of a drawer from an inserted position to a pulled-out position so that a drinks container can be placed on the carriage in the pulled-out position, a holding element arranged on the carriage and having an insertion opening for insertion of a drinks container, the holding element and the carriage being connected with one another by a four-lever mechanism, the carriage forming one lever of the four-lever mechanism and the holding element forming an opposite lever of the four-lever mechanism, the four-lever mechanism movably guiding the holding element and the carriage from a lower position to a raised position, and a control lever which is mounted pivotably on the carriage and engages one lever of the four-lever mechanism, the control lever being pressed down upon displacement of the carriage from the pulled-out position to the inserted position, thus moving the holding element from the raised position to the lowered position, at least one of two elements selected from the group consisting of the four-lever mechanism and the control lever forming a safety catch that prevents the holding element in the raised position from being pressed downwards.

In order to secure the holding element in the raised position, the four-lever mechanism and/or the control lever of the holding device according to the invention are in the form of a safety catch which automatically locks the holding element in the raised position against being pressed down. It is thus not possible for the holding element to be pressed down onto the carriage from the raised position; instead, in order to lower the holding element, the carriage must be pushed into the inserted position, as a result of which the control lever moves the holding element downwards into the lowered position on the carriage. The locking of the holding element in the raised position prevents the holding element from being pressed down unintentionally and prevents associated inadequate holding of an inserted drinks container. The construction according to the invention of the four-lever mechanism and/or of the control lever in the form of a safety catch has the advantage that the locking of the holding element in the raised position against being pressed down is effected automatically upon displacement of the carriage to the pulled-out position. Manual locking of the holding element in the raised position is thus unnecessary, and it is not possible to forget or, owing to laziness, to omit to lock the holding element in the raised position against being pressed down. Moreover, the locking action is cancelled automatically by displacement of the carriage to the inserted position; the holding element therefore does not have to be unlocked in order to lower it onto the carriage. In the holding device according to the invention, the lowering of the holding element onto the carriage is effected exclusively by displacement of the carriage to the inserted position and cannot be obtained by pressure on the holding element.

In an embodiment of the invention, the holding device has a guide track arrangement for the control lever, which presses the control lever downwards upon displacement of the carriage from the pulled-out position to the inserted position. The guide track arrangement enables the lowering of the holding element onto the carriage to be derived in simple manner from the displacement movement of the carriage to the inserted position.

In a preferred embodiment of the invention, the carriage on which the drinks container can be placed when in the pulled-out position is in the form of a drip tray in order to catch any liquid that might spill out of a drinks container inserted therein.

In order to make the four-lever mechanism and/or the control lever in the form of a safety catch, in an embodiment of the invention one lever of the four-lever mechanism that connects the holding element to the carriage is provided with a guideway. Lying in the guideway is a guide element of the control lever, for example a guide pin projecting from the side of the control lever, and the control lever is guided displaceably in the guideway of one lever of the four-lever mechanism. An end portion of the guideway, in which the guide element of the control lever is located when the holding element is raised, extends approximately radially to a pivot axis of the lever. As a result of the path of the guideway, when the holding element is in the raised position it is not possible to pivot the lever by a force engaging it or by a moment, for example by pressing the holding element down, since the guide element of the control lever, which, in the raised position of the holding element, is located in the end portion of the guideway extending radially to the pivot axis of the lever, prevents such a pivotal movement of the lever. In order to pivot the lever, it is necessary to pivot the control lever, which presses the lever of the four-lever mechanism down.

In a development of the invention, the holding device has an erecting spring element which engages a lever of the four-lever mechanism remote from the control lever and urges it upward into an upright position. That erecting spring element effects the raising of the holding element from the carriage, upon displacement of the carriage to the pulled-out position, at an end of the holding element remote from the control lever.

In a preferred embodiment, the holding device has an opening spring element that displaces the carriage from the inserted position to the pulled-out position. This has the advantage that the displacement of the carriage to the pulled-out position is effected automatically. Since the raising of the holding element is also effected by the erecting spring element, the displacement of the carriage to the pulled-out position and the raising of the holding element have an easy automatic action. In order to displace the carriage to the inserted position, the carriage is displaced against the force of the opening spring element, the lowering movement of the holding element onto the carriage being derived from the displacement of the carriage. In the inserted position, the carriage is held by a releasable locking device.

DESCRIPTION OF PREFERRED EMBODIMENTS

Figure 1:
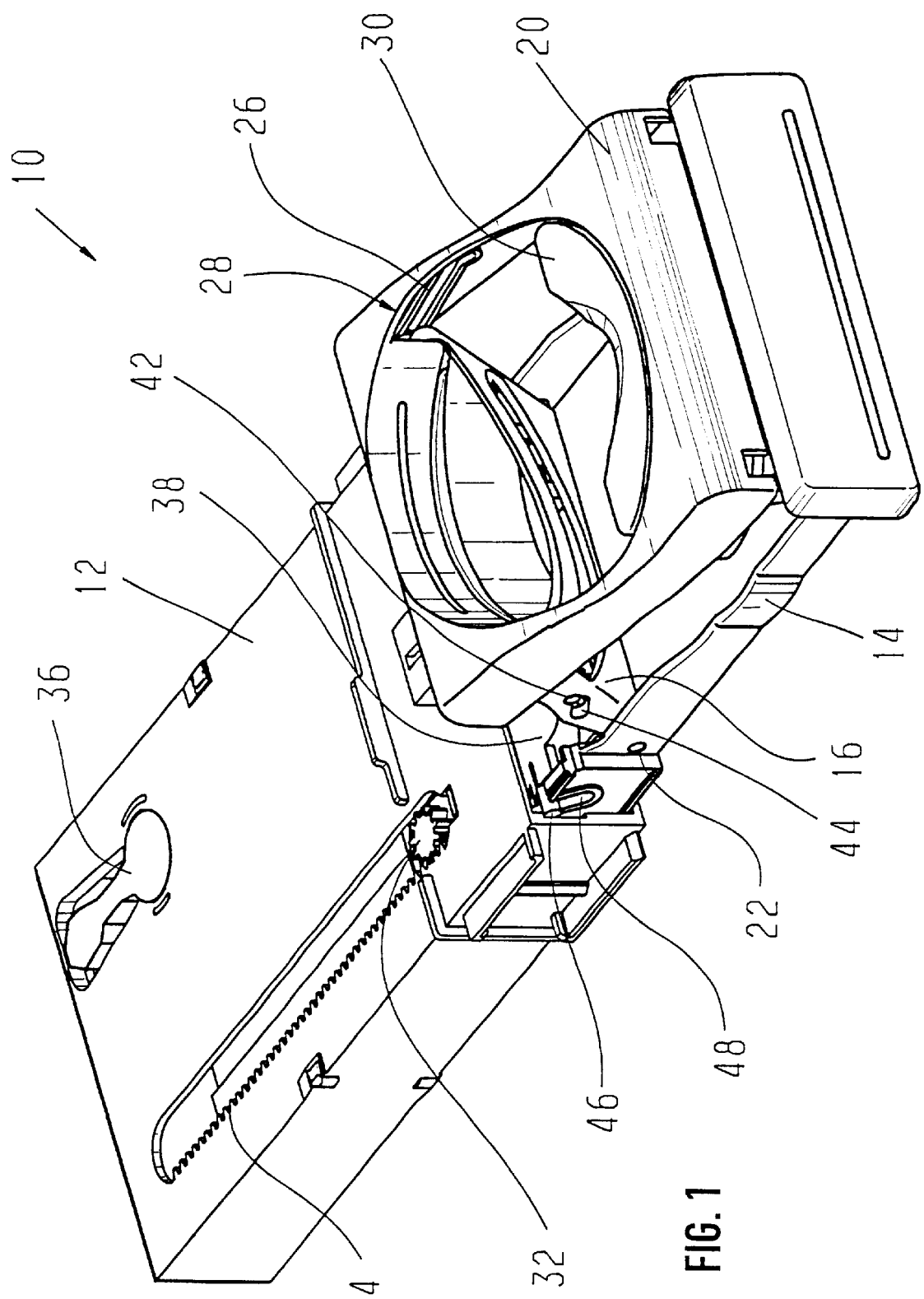
FIG. 1 shows a holding device according to the invention in an inclined perspective view from above and from the front.
Figure 2:
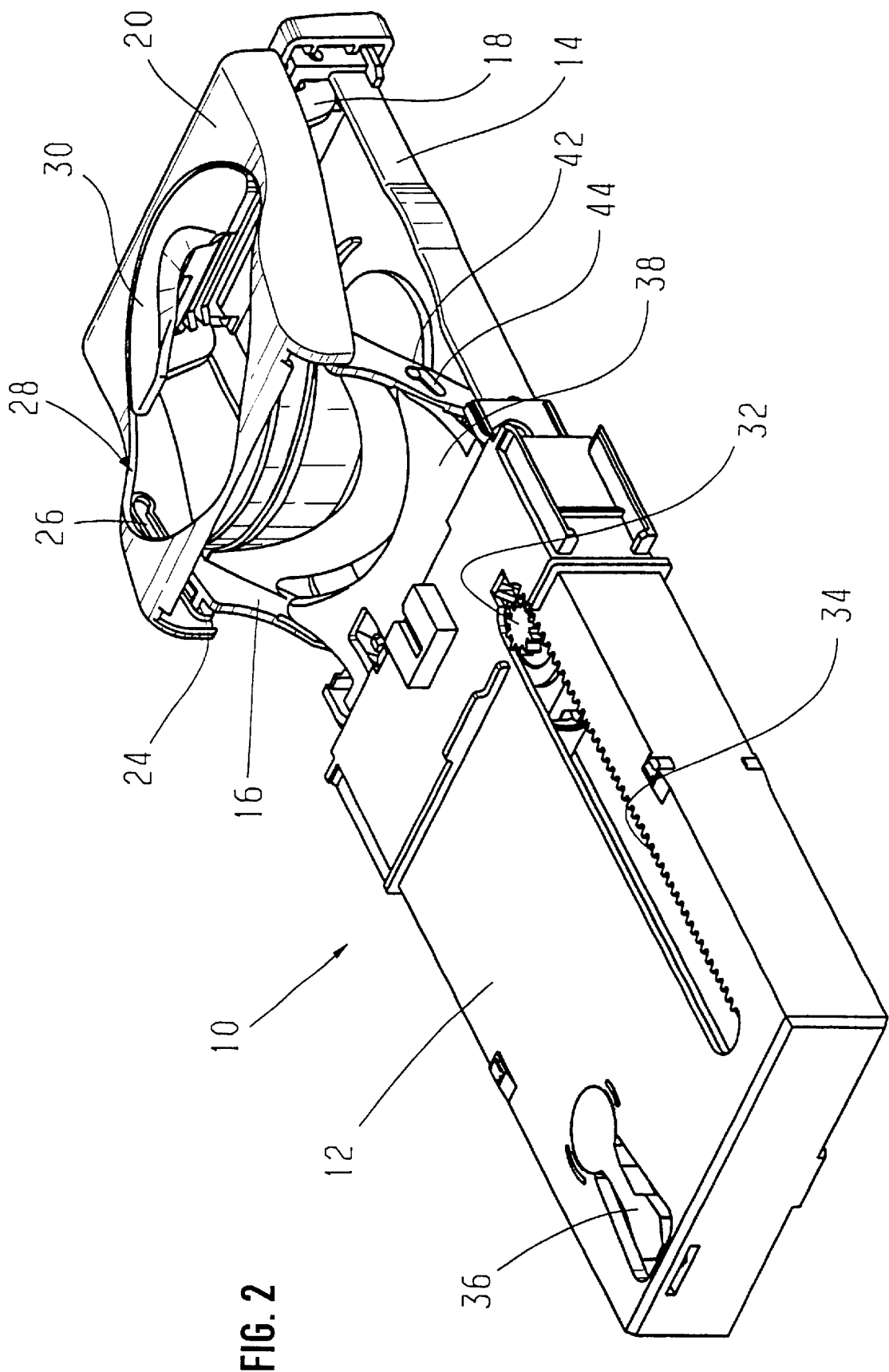
FIG. 2 shows the holding device of FIG. 1 in an inclined perspective view from above and from the rear.

The holding device, according to the invention, for a drinks container (not shown), such as, for example, a drinks can, a cup or a beaker, shown in FIGS. 1 and 2 and denoted as a whole by the reference numeral 10, is provided for installation in a dashboard of a motor vehicle (not shown). The holding device 10 has a box-shaped flat housing 12 having an opening at a front face. In the housing 12, a slide member 14 is guided by means of a sliding guide element in the manner of a drawer so as to be displaceable from an inserted position to the pulled-out position shown in FIGS. 1 and 2. The carriage 14 is in the form of a drip tray.

Mounted movably on the slide member 14 by means of two four-lever mechanisms 14, 16, 18, 20 is a holding element 20. The two four-lever mechanisms 14, 16, 18, 20 are mounted one on each side of the carriage 14 in registration with one another. The carriage 14 and the holding element 20 form a part of the four-lever mechanisms 14, 16, 18, 20. They form two levers 14, 20, arranged opposite one another, of the four-lever mechanism 14, 16, 18, 20. Two further levers 16, 18 of the four-lever mechanism 14, 16, 18, 20 connect the holding element 20, at its rear end and at its front end, movably to the carriage 14. The holding element 20 is a ring that, in the plan view, is approximately square and that has a circular insertion opening for the insertion of a drinks container. A rear lever 16 of the four-lever mechanism 14, 16, 18, 20 is pivotally connected to the carriage 14 by means of pivot pins 22. At its other end, the rear lever 16 has laterally projecting guide pins 24 which engage in guideways 26 of the holding element 20 and are displaceably guided therein. The guideways 26 are straight over the majority of their length and are angled at the end.

A front lever 18 of the four-lever mechanism 14, 16, 18, 20 is connected pivotally at its two ends to the carriage 14 and to the holding element 20. By means of the front and rear levers 18, 16, the holding element 20 is mounted on the carriage 14 so as to be guided movably from a position in which it is lowered onto the carriage 14 to the position, shown in FIGS. 1 and 2, in which it is raised above the carriage. The raising of the holding element 20 is effected, through spring-actuation, by means of two erecting spring elements, not visible in the drawings, that are known per se. Those erecting spring elements are in the form of helical torsion springs and are arranged on the pivot axes of the front and rear levers 18, 16. The erecting spring elements are supported on the carriage 14 and urge the levers 16, 18 upwards.

Arranged pivotally in the insertion opening 28 of the holding element 20 is a spring-loaded compensating flap 30, known perse, that comes to rest against an inserted drinks container and thus adapts the size of the insertion opening 28 to the drinks container. In the pulled-out position of the carriage 14 and in the raised position of the holding element 20, shown in FIGS. 1 and 2, a drinks container (not shown) can be inserted into the insertion opening 28 of the holding element 20 and can be placed on the slide member 14 that is in the form of a drip tray. Owing to the vertical distance of the holding element 20 from the carriage 14, the inserted drinks container is held at sufficient height to prevent the drinks container from tipping over.

The displacement of the carriage 14 to the pulled-out position is effected, through spring-actuation, by means of an opening spring element, not visible in the drawings. The opening spring element is in the form of a scroll spring known per se. The scroll spring is a flat spiral spring that rolls itself up into a coil, that is to say a tension spring. The coil of the scroll spring is mounted rotatably on a rear side of the carriage 14, and an uncoiled end is fastened to a base at the front of the housing 12 so that the tension force of the scroll spring displaces the carriage 14 to the pulled-out position.

The displacement of the carriage.14 is damped by a hydraulic damping element 32 known per se that is inserted in a rear region on the top of the carriage 14, the toothed wheel of which hydraulic damping element engages with a toothed rack 34 that is integral with the housing 12.

In order to hold the carriage 14 in the inserted position in the housing 12, a push-push or heart-shaped curved locking device, known perse, is provided, which has a locking element 36 arranged pivotally in the rear region of the upper side of the housing 12, which locking element locks the carriage 14 in the position in which it is inserted in the housing 12. Brief pressure applied against the carriage 14 from the front unlocks the locking device and the carriage 14 is displaced, through spring-actuation, to the pulled-out position. Upon displacement of the carriage 14 to the pulled-out position, the erecting spring elements (not visible in the drawings) that engage the levers 16, 18 urge the holding element 20 upwards to the raised position.

In order to lower the holding element 20 onto the carriage 14 upon insertion of the carriage 14 into the housing 12, the holding device 10 according to the invention has a control lever 38. The control lever 38 is of plate-shaped construction and extends across the width of the carriage 14. The control lever 38 is arranged behind the rear lever 16 of the four-lever mechanism 14, 16, 18, 20. The control lever 38 is connected pivotally to the carriage 14 by means of laterally projecting pivot pins 40 (see FIG. 3). At an end remote from the pivot pins 40, the control lever 38 has two laterally projecting guide pins 42 that are displaceably guided in guideways 44 in the two rear levers 16. The guideways 44 are mounted in the two rear levers 16 of the two four-lever mechanisms 14, 16, 18, 20 arranged in registration with one another one on each side of the carriage 14. The guideways 44 extend obliquely into the rear lever 16. An end portion of the guideways 44 is angled and extends radially to the pivot pins 22 about which the pivot levers 16 on the carriage 14 can be pivoted. The guide pins 42 of the control lever 38 are located in those radial end portions of the guideways 44 when the holding element 20 is in the raised position. As a result of the radial path of the end portions of the guideways 44, the control lever 38 together with the rear levers 16 of the four-lever mechanism 14, 16, 18, 20 forms a safety catch which allows pivoting of the upwardly pivoted rear levers 16 only as a result of pivoting of the control lever 38, but not as a result of a force or moment exerted upon the rear levers 16. If the rear levers 16 are acted upon by a force in a pivoting direction about the pivot pins 22, the guide pins 42 of the control lever 38, which are in the radial end portion of the guideways 44, lock the rear levers 16 against pivoting. A force acting in the pivoting direction upon the rear levers 16 could be exerted by pressing down the holding element 20 in the raised position. Owing to the construction of the control lever and of the rear levers 16 of the four-lever mechanism 14, 16, 18, 20 in the form of a safety catch, the holding element 20 cannot be pressed down onto the carriage 14 by pressure from above, but must be lowered by pivoting the control lever 38 downwards. This prevents the holding element 20 from being pressed down unintentionally.

Figure 3:
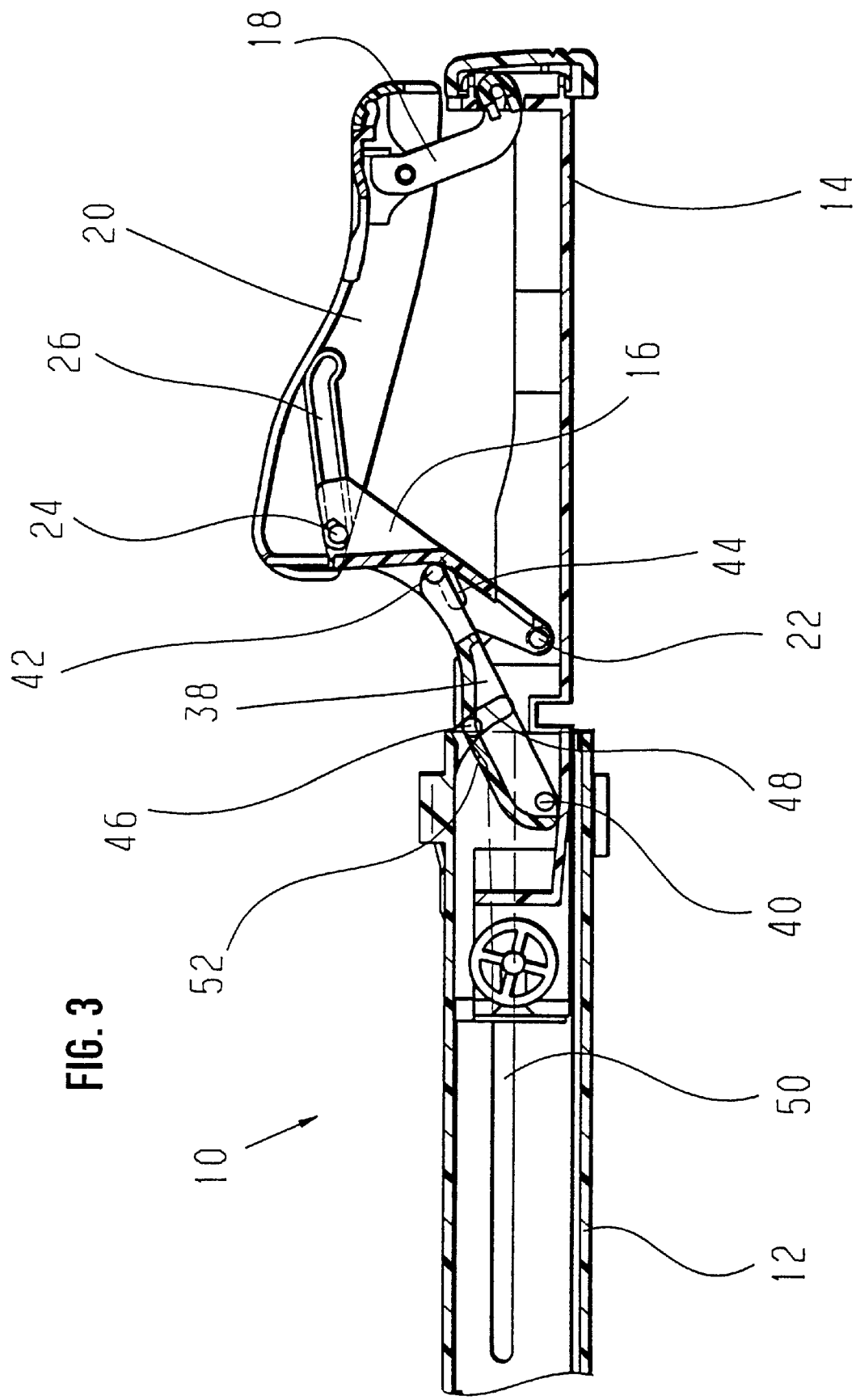
FIGS. 3 to 5 are sections along a central longitudinal plane of the holding device of FIG. 1 in various positions.
Figure 4:
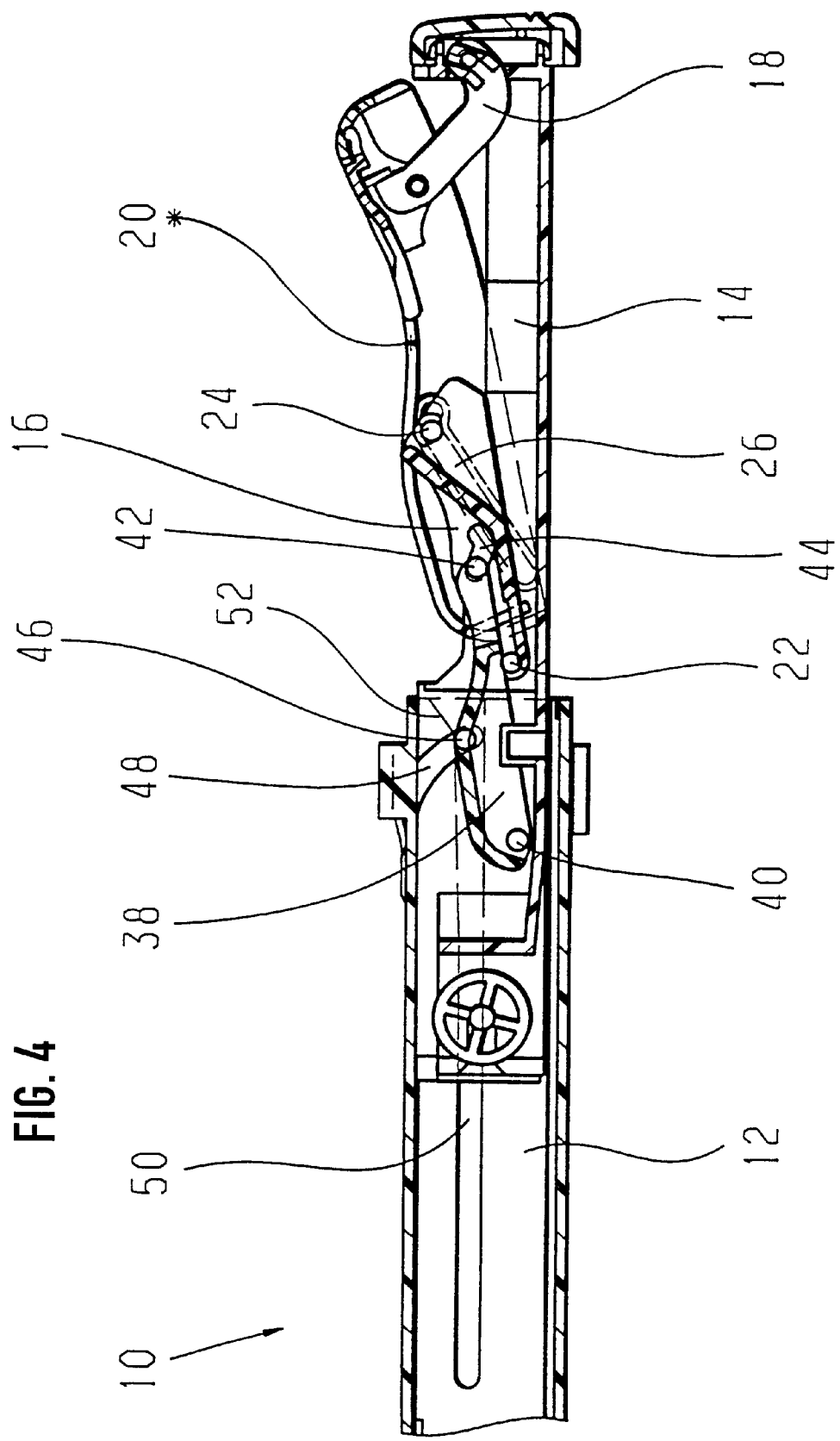
Figure 5:
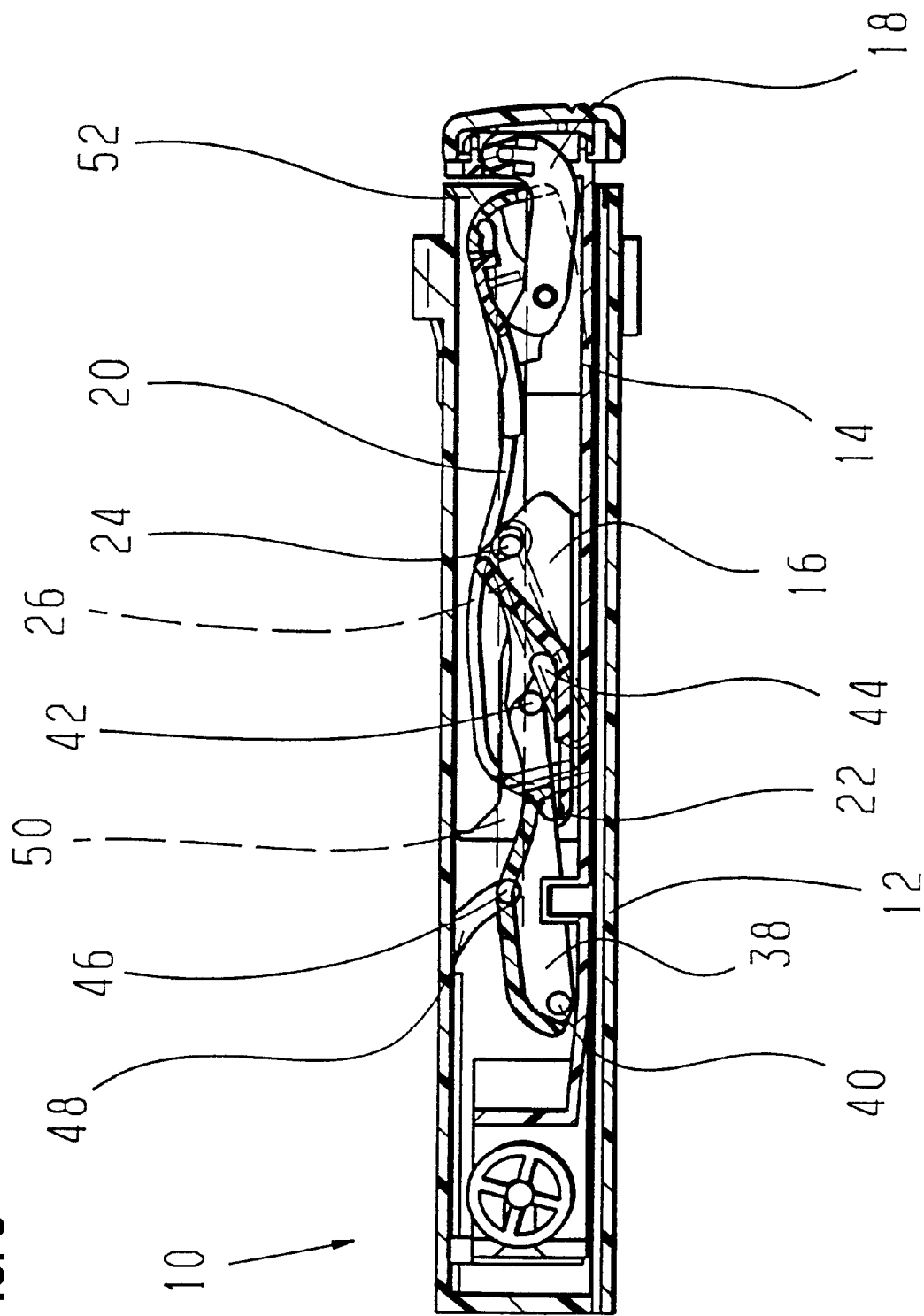

The lowering of the holding element 20 from the raised position will be described by reference to FIGS. 3 to 5. FIG. 3 shows the carriage 14 in the pulled-out position and the holding element 20 in the raised position. FIG. 5 shows the holding element 20 in the position in which it is lowered onto the carriage 14 and the carriage 14 in the position in which it is inserted in the housing 12. FIG. 4 shows an intermediate position. The control lever 38 has two laterally projecting guide pins 46 in its central region. These engage in arcuate slits 48 in side walls of the carriage 14 and are displaceably guided in guideways 50 on the insides of side walls of the housing 12. The guideways 50 extend straight and parallel with the direction of displacement of the carriage 14 and end in an upwardly directed inclined surface 52 open at the opening of the housing 12. The only purpose of the arcuate slits 48 in the side walls of the carriage 14 is to enable the guide pins 46 of the control lever 38 to engage in the guideways 50 in the side walls of the housing 12. The arcuate slits 48 have no other function.

When the carriage 14 is displaced from the pulled-out position into the housing 12, the guide pins 46 in the central region of the control lever 38 slide along the inclined surfaces 52. As a result, the control lever 38 is pressed downwards to the position shown in FIG. 4. The control lever 38, which, by its other guide pins 42, engages in the guideways 44 in the rear levers 16, presses the rear levers 16 down against the opening spring element (not visible) engaging the rear levers 16. Thus, upon insertion of the carriage 14 into the housing 12, the control lever 38 pivots the rear levers 16 down and as a result moves the rear side of the holding element 20 downwards to the position shown in FIG. 4.

Upon lowering of the rear end of the holding element 20, the guide pins 24 of the rear levers 16 slide forwards in the guideways 26 of the holding element. As soon as the holding element 20 has come to rest by its lower rear edge on the carriage 14 or on the rear levers 16, the rear levers 16, which are pressed further downwards by the control lever 38, press the front end of the holding element 20 downwards onto the carriage 14 also. The holding element 20 lies flat on the carriage 14 and is inserted together with the carriage into the housing 12, as shown in FIG. 5.

The housing 12, the carriage 14 in the form of a drip tray, the holding element 20, the levers 16, 18 and the control lever 38 are made as injection-moulded parts from plastics material.

What is claimed is:

1. A holding device for a drink container, comprising a sliding guide element: a carriage displaceably guided by said sliding guide element in a manner of a drawer from an inserted position to a pulled-out position so that a drinks container can be placed on said carriage in said pulled-out position; a holding element arranged on said carriage and having an insertion opening for insertion of a drinks container, said holding element and said carriage being connected with one another by a four-lever mechanism and said holding element forming an opposite lever of said four-lever mechanism, said four-lever mechanism movably guiding said holding element and said carriage from a lower position to a raised position; and a control lever which is mounted pivotably on said carriage and engages one lever of said four-lever mechanism, said control lever being pressed down upon displacement of said carriage from said pulled-out position to said inserted position, thus moving said holding element from said raised position to said lowered position, at least one of two elements selected from the group consisting of said four-lever mechanism and said control lever forming a safety catch that prevents said holding element in said raised position from being pressed downwards, wherein said one lever of said four-lever mechanism connecting said holding element to said carriage has a guide way, said guide way having an end portion in which said guide element is located when said holding element is raised, so that at least one element selected from the group consisting of four-lever mechanism and said control lever forms a safety catch, said end portion of said guide way being raised, extending approximately radially to a pivot axis of said lever.

2. A holding device as defined in claim 1; and further comprising an erecting spring element which engages said four-lever mechanism and urges said holding element into said raised position.

3. A holding device as defined in claim 1; and further comprising a guide-track arrangement for said control lever, said guide track arrangement pressing said control lever downwards upon displacement of said carriage from said pulled-on position to said inserted position.

4. A holding device as defined in claim 1; wherein said carriage is formed as a drip tray.

5. A holding device as defined in claim 1; and further comprising an erecting spring element that urges a lever of said four-lever mechanism which is remote from said control lever and connects said holding element to said carriage in an upright position.

6. A holding device as defined in claim 1; and further comprising an opening spring element which moves said carriage from said inserted position to said pulled-out position, and a releasable locking device which holds said carriage in said inserted position against a force of said opening spring element.

* * * * *